United States Patent
Oh et al.

(10) Patent No.: US 8,415,072 B2
(45) Date of Patent: Apr. 9, 2013

(54) MEMBRANE ELECTRODE ASSEMBLY FOR FUEL CELL

(75) Inventors: Jung-min Oh, Yongin-si (KR); Hae-kyoung Kim, Seoul (KR); Ji-rae Kim, Seoul (KR); Joon-hee Kim, Seongnam-si (KR); Yoon-hoi Lee, Seoul (KR); Sang-hoon Joo, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1958 days.

(21) Appl. No.: 11/508,148

(22) Filed: Aug. 23, 2006

(65) Prior Publication Data

US 2007/0048594 A1 Mar. 1, 2007

(30) Foreign Application Priority Data

Aug. 23, 2005 (KR) .................. 10-2005-0077533

(51) Int. Cl.
*H01M 6/02* (2006.01)

(52) U.S. Cl. ......... 429/520; 429/517; 429/519; 429/534

(58) Field of Classification Search ............ 429/41
See application file for complete search history.

(56) References Cited

U.S. PATENT DOCUMENTS

| | | | |
|---|---|---|---|
| 6,022,634 A | 2/2000 | Ramunni et al. | |
| 6,660,424 B1 | 12/2003 | Gyoten et al. | |
| 2002/0064698 A1 | 5/2002 | Ren | |
| 2003/0124413 A1 | 7/2003 | Bai et al. | |
| 2004/0191605 A1 * | 9/2004 | Kinkelaar et al. | 429/38 |
| 2005/0123816 A1 | 6/2005 | Gao et al. | |
| 2005/0130023 A1 * | 6/2005 | Lebowitz et al. | 429/41 |
| 2006/0134500 A1 | 6/2006 | Marsacq et al. | |

FOREIGN PATENT DOCUMENTS

| | | |
|---|---|---|
| CN | 1643716 A | 7/2005 |
| JP | 11-126624 | 5/1999 |
| JP | 2002-237308 | 8/2002 |
| JP | 2003-45456 | 2/2003 |
| JP | 2003-272671 | 9/2003 |
| JP | P2004-140000 A | 5/2004 |
| JP | 2004-355925 | 12/2004 |
| JP | 2005-105241 | 4/2005 |
| JP | 2005-174872 | 6/2005 |
| JP | 2005-243423 | 9/2005 |
| WO | WO 03/079477 | 9/2003 |
| WO | WO 2005/015669 | 2/2005 |

OTHER PUBLICATIONS

U.S. Appl. No. 11/508,158, filed Aug. 23, 2006, Jung-min Oh et al., Samsung SDI Co., Ltd.

(Continued)

*Primary Examiner* — Ula C Ruddock
*Assistant Examiner* — Tony Chuo
(74) *Attorney, Agent, or Firm* — Lee & Morse, P.C.

(57) ABSTRACT

A membrane electrode assembly for a fuel cell provides a current collector adjacent to an electrode catalyst layer. Since electrons passing between the current collector and the electrode catalyst layer do not pass through a diffusion layer or a supporting layer, the diffusion layer or supporting layer may be non-conductive. Thus, various materials that are hydrophilic, hydrophobic, porous, hydrous, or the like can be used for the diffusion layer and the supporting layer, thereby improving the performance of the fuel cell. In addition, manufacturing costs of the membrane electrode assembly can be decreased since the membrane electrode assembly can be manufactured quickly with low energy.

14 Claims, 3 Drawing Sheets

OTHER PUBLICATIONS

First Office Action issued Mar. 7, 2008 by the Patent Office of the People's Republic of China re: Chinese Application No. 2006101215792 (8 pp).

Office Action issued May 9, 2008, in corresponding Chinese Application No. 2006101595062.

Certificate of Patent No. 200610159506.2 issued by the Chinese Intellectual Property Office for a corresponding Chinese application.

Japanese Office Action issued Apr. 6, 2010, in corresponding Japanese Patent Application No. 2006-256797.

US Office Action issued Jan. 21, 2010, in co-pending U.S. Appl. No. 11/508,158.

Japanese Office Action issued Feb. 2, 2010, in corresponding Japanese Patent Application No. 2006-226056.

* cited by examiner

MEMBRANE ELECTRODE ASSEMBLY FOR FUEL CELL

CROSS-REFERENCE TO RELATED APPLICATION

This application claims the benefit of Korean Patent Application No. 2005-77533, filed on Aug. 23, 2005, in the Korean Intellectual Property Office, the disclosure of which is incorporated herein in its entirety by reference.

BACKGROUND OF THE INVENTION

1. Field of the Invention

Aspects of the present invention relate to a membrane electrode assembly for a fuel cell, and more particularly, to a membrane electrode assembly for a fuel cell including a diffusion layer and/or a supporting layer selectively containing one or more of a hydrophilic material, a hydrophobic material, a porous material, a hydrous material, and the like that are required to improve the performance of the fuel cell.

2. Description of the Related Art

A fuel cell is a type of energy generating system in which energy from a chemical reaction between hydrogen and oxygen, or between hydrogen contained in a hydrocarbon-based material, such as methanol, ethanol, or natural gas, and oxygen is directly converted to electrical energy. Fuel cells can be categorized as phosphoric acid type fuel cells, molten carbonate type fuel cells, solid oxide type fuel cells, polymer electrolyte membrane fuel cells, alkali type fuel cells, and the like, according to the electrolyte that is used. These fuel cells operate on the same principle, but have different fuels, different operating temperatures, different catalysts, and different electrolytes.

A fuel cell stack that substantially generates electricity in a fuel cell system generally has a stack structure including a plurality of unit cells including membrane electrode assemblies (MEAs) and separators or bipolar plates. An MEA has a structure including: an anode, i.e., a fuel electrode or an oxidation electrode; a cathode, i.e., an air electrode or a reduction electrode; and a polymer electrolyte membrane interposed therebetween.

That is, an electrolyte membrane is located at the center of the MEA, and electrodes, in particular, a cathode and an anode, are disposed on respective sides of the electrolyte membrane. Each electrode includes a catalyst layer, a diffusion layer, and a supporting layer. In a conventional fuel cell, current collectors that collect the current generated in the electrodes and transfer the collected current to outer circuits are located outside of the supporting layer. Thus, the diffusion layer and the supporting layer in the conventional fuel cell must be electrically conductive so that the current generated in the catalyst layer can flow to the current collectors.

Meanwhile, the diffusion layer and the supporting layer can be porous, in order to distribute materials, hydrophobic, in order to rapidly discharge the generated water, or hydrophilic and/or hydrous, in order to smoothly supply water. However, since the materials forming the diffusion layer and the supporting layer in the conventional fuel cell must also be electrically conductive, the choice of materials forming the diffusion layer and the supporting layer is necessarily limited, and thus, the performance of the fuel cell is limited.

Research so far has focused only on improving the physical properties of diffusion layers and supporting layers that are electrically conductive. There has been no research focused on developing non-conductive materials for the diffusion layer and the supporting layer, an avenue of research that is made possible by changing the location of the current collectors as described herein.

SUMMARY OF THE INVENTION

Aspects of the present invention provide a structure of a membrane electrode assembly for a fuel cell including an electrically nonconductive diffusion layer.

Aspects of the present invention also provide a fuel cell including the membrane electrode assembly.

According to an aspect of the present invention, there is provided a membrane electrode assembly for a fuel cell including: an electrolyte membrane; an anode current collector and a cathode current collector each being formed on respective sides of the electrolyte membrane; an anode catalyst layer formed on the anode current collector and a cathode catalyst layer formed on the cathode current collector; and an anode diffusion layer formed on the anode catalyst layer and a cathode diffusion layer formed on the cathode catalyst layer, wherein the anode diffusion layer and the cathode diffusion layer are electrically nonconductive.

According to another aspect of the present invention, there is provided a membrane electrode assembly for a fuel cell including: an electrolyte membrane; an anode catalyst layer and a cathode catalyst layer each being formed on respective sides of the electrolyte membrane; an anode current collector formed on the anode catalyst layer and a cathode current collector formed on the cathode catalyst layer; and an anode diffusion layer formed on the anode current collector and a cathode diffusion layer formed on the cathode current collector, wherein the anode diffusion layer and the cathode diffusion layer are electrically nonconductive.

According to another aspect of the present invention, there is provided a fuel cell including the membrane electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A membrane electrode assembly for a fuel cell according to an embodiment of the present invention includes: an electrolyte membrane; an anode current collector and a cathode current collector formed on respective sides of the electrolyte membrane; an anode catalyst layer formed on the anode current collector and a cathode catalyst layer formed on the cathode current collector; and an anode diffusion layer formed on the anode catalyst layer and a cathode diffusion layer formed on the cathode catalyst layer, wherein the anode diffusion layer and the cathode diffusion layer are electrically nonconductive.

Alternatively, a membrane electrode assembly for a fuel cell according to another embodiment of the present invention includes: an electrolyte membrane; an anode catalyst layer and a cathode catalyst layer formed on respective sides of the electrolyte membrane; an anode current collector formed on the anode catalyst layer and a cathode current collector formed on the cathode catalyst layer; and an anode diffusion layer formed on the anode current collector and a cathode diffusion layer formed on the cathode current collector, wherein the anode diffusion layer and the cathode diffusion layer are electrically nonconductive.

A transition metal having electrical conductivity of 1 S/cm or greater, may be used as the current collector. As non-limiting examples, Au, Ag, Al, Ni, Cu, Pt, Ti, Mn, Zn, Fe, Sn or alloys thereof may be used to form the current collector. In addition, a conductive polymer such as polyaniline may be used as the current collector.

The current collector can be directly formed on the electrolyte membrane or the electrode catalyst layer. Alternatively, the current collector can be separately prepared and then bonded to the electrolyte membrane or the electrode catalyst layer. The method of directly forming the current collector on the electrolyte membrane or the electrode catalyst layer can be sputtering, chemical vapor deposition (CVD), or electrodeposition. The method of separately preparing the current collector and bonding it to the electrolyte membrane or the electrode catalyst layer can be performed using a flexible printed circuit board (FPCB) in which a conductive metal is formed on a metal mesh or a support. The support may be, for example, an electrically conductive polymer film.

The constitution of the membrane electrode assembly will be described with reference to FIGS. 1, 2A, and 2B.

Figure 1:
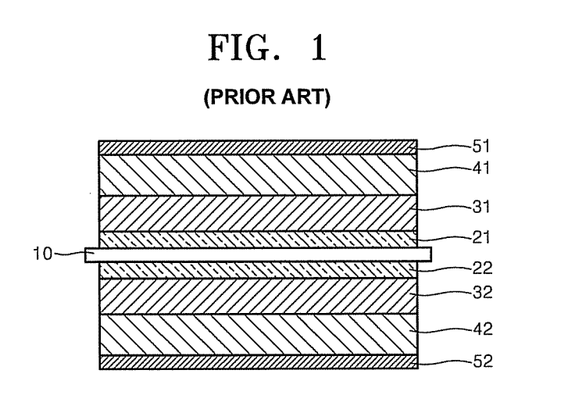
FIG. 1 is a side cross-sectional view of the structure of a conventional membrane electrode assembly for a fuel cell.
Figure 2A:
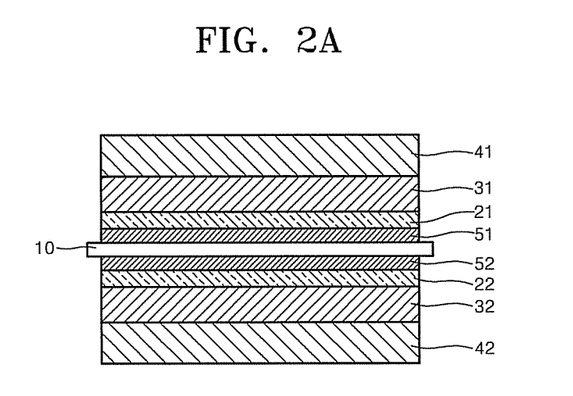
FIGS. 2A and 2B are side cross-sectional views of structures of membrane electrode assemblies for a fuel cell according to embodiments of the present invention.
Figure 2B:
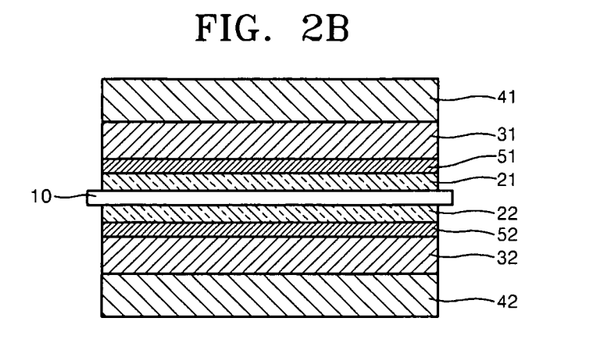

FIG. 1 is a side cross-sectional view of the structure of a conventional membrane electrode assembly for a fuel cell, and FIGS. 2A and 2B are side cross-sectional views of structures of membrane electrode assemblies for a fuel cell according to embodiments of the present invention.

The conventional membrane electrode assembly for a fuel cell illustrated in FIG. 1 includes an electrolyte membrane 10 at the center, and an anode catalyst layer 21 on one side of the electrolyte membrane 10 and a cathode catalyst layer 22 on the other side of the electrolyte membrane 10. An anode diffusion layer 31 is formed on the anode catalyst layer 21 and a cathode diffusion layer 32 is formed on the cathode catalyst layer 22. An anode supporting layer 41 is formed on the anode diffusion layer 31 and a cathode supporting layer 42 is formed on the cathode diffusion layer 32. An anode current collector 51 can be formed on the anode supporting layer 41 and a cathode current collector 52 can be formed on the cathode supporting layer 42.

Thus, the anode and cathode diffusion layers 31 and 32 and the anode and cathode supporting layers 41 and 42, which are interposed between the anode and cathode catalyst layers 21 and 22 and the anode and cathode current collectors 51 and 52, should be electrically conductive so that the current generated in the anode and cathode catalyst layers 21 and 22 can flow to the anode and cathode current collectors 51 and 52.

Referring to FIG. 2A, the membrane electrode assembly for a fuel cell according to an embodiment of the present invention, on the other hand, includes an electrolyte membrane 10 at the center, and an anode current collector 51 on one side of the electrolyte membrane 10, and a cathode current collector 52 on the other side of the electrolyte membrane 10. An anode catalyst layer 21 is formed on the anode current collector 51 and a cathode catalyst layer 22 is formed on the cathode current collector 52. An anode diffusion layer 31 is formed on the anode catalyst layer 21 and a cathode diffusion layer 32 is formed on the cathode catalyst layer 22. An anode supporting layer 41 can be formed on the anode diffusion layer 31 and a cathode supporting layer 42 can be formed on the cathode diffusion layer 32.

Referring to FIG. 2B, the membrane electrode assembly for a fuel cell according to another embodiment of the present invention includes an electrolyte membrane 10 at the center, and anode catalyst layer 21 on one side of the electrolyte membrane 10, and a cathode catalyst layer 22 on the other side of the electrolyte membrane 10. An anode current collector 51 is formed on the anode catalyst layer 21 and a cathode current collector 52 is formed on the cathode catalyst layer 22. An anode diffusion layer 31 is formed on the anode current collector 51 and a cathode diffusion layer 32 is formed on the cathode current collector 52. An anode supporting layer 41 can be formed on the anode diffusion layer 31 and a cathode supporting layer 42 can be formed on the cathode diffusion layer 32. In other words, the anode current collector 51 and the cathode current collector 52 may be interposed between the anode and cathode catalyst layers 21 and 22, respectively, and the anode and cathode diffusion layers 31 and 32, respectively, as illustrated in FIG. 2B.

Accordingly, in the membrane electrode assemblies illustrated in FIGS. 2A and 2B according to the embodiments of the present invention, the current generated in the electrode catalyst layer does not need to pass through the diffusion layer and the supporting layer in order to provide current flow between the electrode catalyst layer and the current collector, and thus, the diffusion layer and the supporting layer do not need to be electrically conductive. Therefore, electric resistance that is generated when electrons generated in the catalyst layer of the conventional membrane electrode assembly pass through the diffusion layer and the supporting layer is not generated in the membrane electrode assemblies according to the embodiments of the present invention. In addition, a broader range of materials to form the diffusion layer may be considered in order to improve the performance of the fuel cell of the present invention, since the selection is not longer limited to electrically conductive materials.

In addition, the manufacturing cost of the membrane electrode assemblies according to the embodiments of the present invention can be significantly decreased, since the membrane electrode assemblies can be manufactured quickly with low energy.

The diffusion layer may be hydrophobic, hydrophilic, porous, and/or hydrous.

The diffusion layer may have hydrophobic or hydrophilic properties in order to rapidly discharge water formed in the electrode catalyst layer or in order to provide a smooth flow of air. For example, a hydrophobic material in the diffusion layer may be a material selected from the group consisting of a polyethylene-based polymer resin, a polystyrene-based polymer resin, a fluorine-based polymer resin, a polypropylene-based polymer resin, a polymethylmethacrylate-based polymer resin, a polyimide-based polymer resin, a polyamide-based polymer resin, a polyethyleneterephthalate-based polymer resin, and a mixture thereof, but is not limited thereto.

The diffusion layer may also be hydrophilic in order to smoothly supply water. For example, the hydrophilic material in the diffusion layer may be a material selected from the group consisting of a polymer resin containing a hydroxyl group, a carboxyl group, an amine group or a sulfone group on at least one end thereof, a polyvinylalcohol-based polymer resin, a cellulose-based polymer resin, a polyvinylamine-based polymer resin, a polyethyleneoxide-based polymer resin, a polyethyleneglycol-based polymer resin, a nylon-based polymer resin, a polyacrylate-based polymer resin, a polyester-based polymer resin, a polyvinylpyrrolidone-based polymer resin, a ethylenevinylacetate-based resin, and a mixture thereof, but is not limited thereto.

The diffusion layer may also be hydrous in order to smoothly supply water. For example, the hydrous material in the diffusion layer may be a metal oxide such as $Al_2O_3$, $ZrO_2$, and $TiO_2$, or $SiO_2$, in addition to the hydrophilic materials described above. The diffusion layer is not limited to these materials.

The diffusion layer may also be porous in order to smoothly supply an oxidizing agent such as air. For example, a porous material in the diffusion layer may be a porous polymer resin or other particulate matter. The porous material can be one of the hydrophilic or hydrophobic materials described above, but is not limited thereto.

An average diameter of pores of the porous material may be in the range of 3 nm to 500 μm. When the diameter of pores of the porous material is less than 3 nm, the pressure sharply drops and the gas diffusion cannot properly occur. When the diameter of pores of the porous material is greater than 500 μm, gas diffusion may not be uniform.

A void fraction of the porous material may be in the range of 20 to 90%. When the void fraction of the porous material is less than 20%, the gas diffusion cannot properly occur. When the void fraction of the porous material is greater than 90%, the mechanical strength of the diffusion layer may decrease excessively.

The nonconductive materials that may be hydrophobic, hydrophilic, hydrous or porous described above may be particulate matter. The particles of the particulate matter may have a stick shape, a spherical shape, a fibrous shape, or other irregular shapes, but the shape of the particles is not limited. The dimension of the particles of the nonconductive particulate matter may be in the range of 50 nm to 500 μm. When the dimension of the particles is within this range, a proper diameter of the pores and a suitable void fraction can be achieved.

To form a diffusion layer using the nonconductive particulate matter, a binder may be used to bond the particles of the particulate matter. The binder may be a polymer material such as polyvinylidenefluoride (PVdF), or a hydrophilic or hydrophobic polymer material described above, but is not limited thereto.

The amount of the binder may be in the range of 20 to 90% by weight based on the weight of a mixture of the nonconductive particulate material and the binder. When the amount of the binder is less than 20% by weight, the diffusion layer may not be mechanically strong enough due to insufficient bonding between the nonconductive material particles. When the amount of the binder is greater than 90% by weight, the desired properties of the nonconductive material may not be fully achieved.

The diffusion layer may be prepared by laminating layers each having one of the different properties described above. Also, a single diffusion layer may have two or more properties described above at the same time.

In addition, the membrane electrode assemblies according to the embodiments of the present invention may further include a supporting layer formed on each of the anode diffusion layer and the cathode diffusion layer.

The supporting layer does not need to be electrically conductive since the current generated in the electrode catalyst layer does not need to pass through the supporting layer to reach the current collector.

Accordingly, the supporting layer may be composed of one of a nonconductive material and a conductive material, or a mixture thereof. The nonconductive material may be a particulate matter. The particles of the particulate matter may have a stick shape, a spherical shape, a fibrous shape, or other, irregular shapes, but the shape of the particulate matter is not limited thereto. The dimension of the particles of the nonconductive particulate matter may be in the range of 50 nm to 500 μm. When the dimension of the particles is within this range, a proper diameter of the pores and a suitable void fraction can be achieved.

When the particles of the nonconductive material cannot be formed into a plate by themselves, a binder may be used to bind the particles to form a plate. The binder may be any polymer resin. In particular, the binder may be a hydrophilic or a hydrophobic polymer material described above, such as, for example polyvinylidenefluoride (PVdF), but is not limited thereto.

The amount of the binder may be in the range of 10 to 90% by weight based on the weight of the supporting layer. When the amount of the binder is less than 10% by weight, the supporting layer may not be mechanically strong enough due to insufficient bonds between the nonconductive material particles. When the amount of the binder is greater than 90% by weight, the properties of the nonconductive material may not be fully achieved.

In addition, various other materials can be used to form the supporting layer to improve the performance of the fuel cell without the limitation of being electrically conductive.

The supporting layer may be hydrophobic, hydrophilic, porous, and/or hydrous, like the diffusion layer described above.

The supporting layer may have hydrophobic or hydrophilic properties in order to rapidly discharge water formed in the electrode or in order to provide a smooth flow of air. As non-limiting examples, a hydrophobic material in the supporting layer may be one of a polyethylene-based polymer resin, a polystyrene-based polymer resin, a fluorine-based polymer resin, a polypropylene-based polymer resin, a polymethylmethacrylate-based polymer resin, a polyimide-based polymer resin, a polyamide-based polymer resin, and a polyethyleneterephthalate-based polymer resin, or a mixture thereof, but is not limited thereto.

The supporting layer may also be hydrophilic in order to smoothly supply water. As non-limiting examples, a hydrophilic material in the supporting layer may be one of a polymer resin containing a hydroxyl group, a carboxyl group, an amine group or a sulfone group in one end, a polyvinylalcohol-based polymer resin, a cellulose-based polymer resin, a polyvinylamine-based polymer resin, a polyethyleneoxide-based polymer resin, a polyethyleneglycol-based polymer resin, a nylon-based polymer resin, a polyacrylate-based polymer resin, a polyester-based polymer resin, a polyvinylpyrrolidone-based polymer resin and a ethylenevinylacetate-based resin, or a mixture thereof, but is not limited thereto.

The supporting layer may also be hydrous to smoothly supply water. As non-limiting examples, a hydrous material in the supporting layer may be a metal oxide such as $Al_2O_3$, $ZrO_2$, and $TiO_2$, or $SiO_2$, in addition to the hydrophilic material described above, but is not limited thereto.

The supporting layer may also be porous to smoothly supply an oxidizing agent such as air. A porous material in the supporting layer may be a porous polymer resin or other particulate matter. The porous material can be a hydrophilic or hydrophobic material described above, but is not limited thereto.

An average diameter of the pores of the porous material may be in the range of 0.1 μm to 1 mm. When the diameter of pores of the porous material is less than 0.1 μm, the pressure sharply drops and the gas diffusion cannot properly occur. When the diameter of pores of the porous material is greater than 1 mm, gas diffusion may not be uniform.

A void fraction of the porous material may be in the range of 10 to 90%. When the void fraction of the porous material is less than 10%, the gas diffusion cannot properly occur. When the void fraction of the porous material is greater than 90%, the mechanical strength of the supporting layer may decrease excessively.

The supporting layer may also be composed of an electrically conductive material such as a metal and a carbon-based material. The supporting layer may also be composed of a ceramic material, since the supporting layer does not need to be electrically conductive.

The carbon-based material may be carbon fiber, carbon paper, carbon cloth, carbon nanotube, carbon nanofiber, carbon nanohorn, carbon nanoring, carbon black, graphite, fullerene, activated carbon, acetylene black, or the like.

The ceramic material may be a metal oxide such as alumina, tungsten oxide, nickel oxide, vanadium oxide, zirconia, and titania, a silica-based compound such as zeolite, a clay such as montmorillonite, bentonite, and mullite, silicon carbide, or cordierite, but is not limited thereto.

The supporting layer may be prepared by laminating layers having one or more of the different properties described above. Also, single supporting layer may have two or more properties described above at the same time.

A fuel cell including the membrane electrode assembly of the present invention is provided according to an embodiment of the present invention.

The fuel cell according to the current embodiment of the present invention includes the membrane electrode assembly having the structure as described above. The fuel cell of the present embodiment may be employed in proton exchange membrane fuel cells (PEMFCs), direct methanol fuel cells (DMFCs), phosphoric acid fuel cells (PAFCs), etc. In particular, the fuel cell of the present embodiment may be effectively employed in PEMFCs and DMFCs.

The fuel cell of the present embodiment may be manufactured using various known methods without particular restriction. A detailed description of such known methods is not disclosed herein.

Aspects of the present invention will be described in greater detail with reference to the following examples. The following examples are for illustrative purposes only and are not intended to limit the scope of the invention.

Example 1

7 g of ordered mesoporous silica (OMS) and 3 g of PVdF were sufficiently dispersed in 20 ml of acetone by stirring for 60 minutes to prepare a first dispersion. 7 g of silica ($SiO_2$) and 3 g of PVdF were sufficiently dispersed in 20 ml of acetone by stirring for 60 minutes to prepare a second dispersion. Nickel current collectors were disposed on both sides of an electrolyte membrane (NAFION 112 (DuPont)) in a 3 cm×3 cm mesh, and then, commercially available catalyst layers in which platinum is supported on carbon were disposed on the current collectors.

The first and second dispersions were sprayed onto the catalyst layers and dried at room temperature for about 10 minutes to form diffusion layers. Here, the first dispersion was sprayed to form a cathode diffusion layer, and the second dispersion was sprayed to form an anode diffusion layer. Then, carbon paper (available from Toray Industries, Inc.) was disposed on the anode diffusion layer to form an anode supporting layer and carbon paper containing 20% by weight of PTFE was disposed on the cathode diffusion layer to form a cathode supporting layer and complete the formation of a membrane electrode assembly.

The structure of the membrane electrode assembly of Example 1 is summarized in Table 1, below. Table 1 provides a visual guide to the layers of each of Examples 1 to 4 and the Comparative Example, from the outermost anode layer to the outermost cathode layer.

Figure 3:
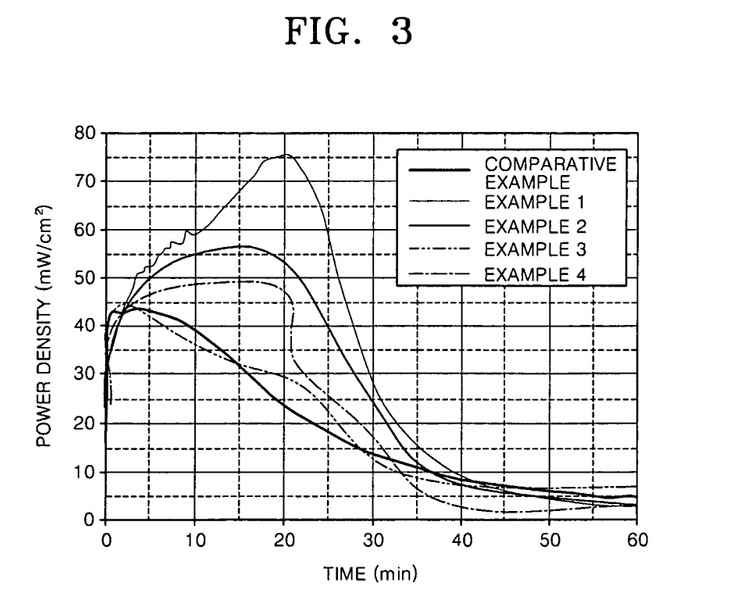
FIG. 3 is a graph illustrating test results of fuel cells of Examples and a Comparative Example.
Figure 4:
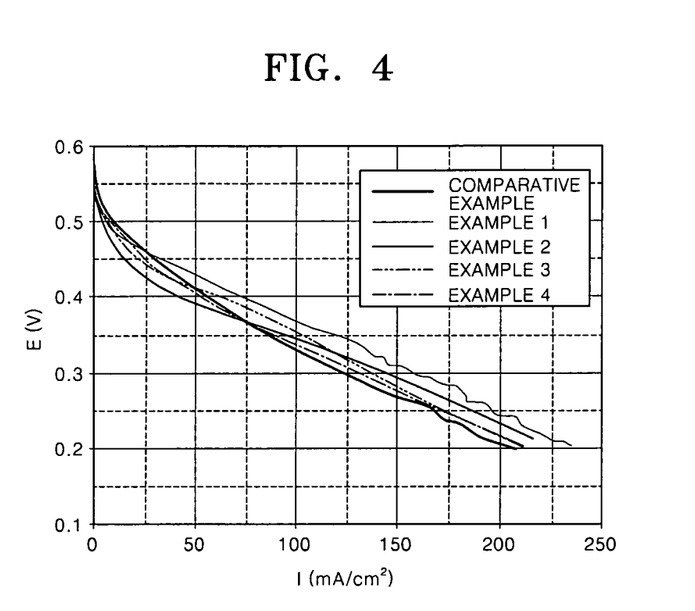
FIG. 4 is a graph illustrating test results of fuel cells of Examples and a Comparative Example.

A DMFC was produced employing the membrane electrode assembly prepared in Example 1 above. A 3 M methanol solution was supplied to the anode and air was manually supplied to the cathode to measure the performance of the DMFC. The results are illustrated in FIGS. 3 and 4.

Example 2

7 g of nano-sized silica and 3 g of PVdF were sufficiently dispersed in 20 ml of acetone by stirring for 60 minutes to prepare a first dispersion. 7 g of silica ($SiO_2$) and 3 g of PVdF were sufficiently dispersed in 20 ml of acetone by stirring for 60 minutes to prepare a second dispersion. Nickel current collectors were disposed on both sides of an electrolyte membrane (NAFION 112) in a 3 cm×3 cm mesh, and then commercially available catalyst layers in which platinum is supported on carbon were disposed on the current collectors. The first and second dispersions were sprayed onto the catalyst layers and dried at room temperature for about 10 minutes to form diffusion layers. Here, the first dispersion was sprayed to form a cathode diffusion layer, and the second dispersion was sprayed to form an anode diffusion layer. Then, carbon paper (available from Toray Industries, Inc.) was disposed on the anode diffusion layer to form an anode supporting layer and carbon paper containing 20% by weight of PTFE was disposed on the cathode diffusion layer to form a cathode supporting layer and complete the formation of a membrane electrode assembly.

The structure of the membrane electrode assembly of Example 2 is summarized in Table 1.

A DMFC was produced employing the membrane electrode assembly prepared in Example 2 above. A 3 M methanol solution was supplied to the anode and air was manually supplied to the cathode to measure the performance of the DMFC. The results are illustrated in FIGS. 3 and 4.

Example 3

7 g of carbon powder and 3 g of PTFE were sufficiently dispersed in 20 ml of isopropylalcohol by stirring for 60 minutes to prepare a dispersion. Nickel current collectors were disposed on both sides of an electrolyte membrane (NAFION 112 (DuPont)) in a 3 cm×3 cm mesh, and then, commercially available catalyst layers in which platinum is supported on carbon were disposed on the current collectors.

The first dispersion was sprayed onto the catalyst layers and dried at room temperature for about 10 minutes to form diffusion layers. Then, carbon paper (available from Toray Industries, Inc.) was disposed on an anode diffusion layer to form an anode supporting layer and carbon paper containing 20% by weight of PTFE was disposed on a cathode diffusion layer to form a cathode supporting layer to complete the formation of a membrane electrode assembly.

The structure of the membrane electrode assembly of Example 3 is summarized in Table 1.

A DMFC was produced employing the membrane electrode assembly prepared in Example 3 above. A 3 M methanol solution was supplied to the anode and air was manually supplied to the cathode to measure the performance of the DMFC. The results are illustrated in FIGS. 3 and 4.

Example 4

7 g of nano-sized titania and 3 g of PVdF were sufficiently dispersed in 20 ml of acetone by stirring for 60 minutes to prepare a first dispersion. 7 g of ordered mesoporous silica (OMS) and 3 g of PVdF were sufficiently dispersed in 20 ml of acetone by stirring for 60 minutes to prepare a second dispersion. Commercially available catalyst layers in which platinum is supported on carbon were disposed on both sides of an electrolyte membrane (NAFION 112), and then nickel current collectors in a 3 cm×3 cm mesh were disposed on the catalyst layers. The first and second dispersions were sprayed on the catalyst layers and dried at room temperature for about 10 minutes to form diffusion layers. Here, the first dispersion was sprayed to form a cathode diffusion layer, and the second dispersion was sprayed to form an anode diffusion layer. Then, carbon paper (available from Toray Industries, Inc.) was deposited on the anode diffusion layer to form an anode supporting layer and carbon paper containing 20% by weight of PTFE was deposited on the cathode diffusion layer to form a cathode supporting layer and complete the formation of a membrane electrode assembly.

The structure of the membrane electrode assembly of Example 4 is summarized in Table 1.

A DMFC was produced employing the membrane electrode assembly prepared in Example 4 above. A 3 M methanol solution was supplied to the anode and air was manually supplied to the cathode to measure the performance of the DMFC. The results are illustrated in FIGS. 3 and 4.

Comparative Example 7 g of carbon powder and 3 g of PTFE were sufficiently dispersed in 20 ml of isopropylalcohol by stirring for 60 minutes to prepare a dispersion. Commercially available catalyst layers in which platinum is supported on carbon were disposed on both sides of an electrolyte membrane (NAFION 112). The dispersion was sprayed on the catalyst layers and sintered in an oven at 360° C. for 40 minutes. Then, carbon paper (available from Toray Industries, Inc.) was disposed on an anode diffusion layer to form an anode supporting layer and carbon paper containing 20% by weight of PTFE was deposited on a cathode diffusion layer to form a cathode supporting layer. Ni-Mesh current collectors were disposed on the anode and cathode supporting layers to complete the formation of a membrane electrode assembly.

The structure of the membrane electrode assembly of the Comparative Example is summarized in Table 1.

A DMFC was produced employing the membrane electrode assembly prepared in the Comparative Example above. A 3 M methanol solution was supplied to the anode and air was manually supplied to the cathode to measure the performance of the DMFC. The results are illustrated in FIGS. 3 and 4. In FIG. 4, I indicates a current density, and E indicates cell voltage.

TABLE 1

|  | Example 1[a] | Example 2[a] | Example 3[a] | Example 4[c] | Comparative Example[b] |
|---|---|---|---|---|---|
| Current collector | | Not used | | | Ni-Mesh |
| Anode supporting layer | | Commercially available carbon paper | | | |
| Anode diffusion layer | $SiO_2$ + PVdF (Binder) | $SiO_2$ + PVdF (Binder) | Carbon + PTFE | $TiO_2$ + PVdF (Binder) | Carbon + PTFE |
| Current collector | | Not used | | Ni-Mesh | Not used |
| Anode catalyst layer | | Commercially available platinum catalyst layer | | | |
| Current collector | | Ni-Mesh | | Not used | |
| Electrolyte membrane | | NAFION 112 | | | |
| Current collector | | Ni-Mesh | | Not used | |
| Cathode catalyst layer | | Commercially available platinum catalyst layer | | | |
| Current collector | | Not used | | Ni-Mesh | Not used |
| Cathode diffusion layer | OMS + PVdF (Binder) | $SiO_2$ + PVdF (Binder) | Carbon + PTFE | OMS + PVdF (Binder) | Carbon + PTFE |
| Cathode supporting layer | | Carbon paper containing 20% by weight PTFE | | | |
| Current collector | | Not used | | | Ni-Mesh |

[a]The current collector is interposed between the electrolyte membrane and the catalyst layer.
[b]The current collector is located outside of the membrane electrode assembly.
[c]The current collector is interposed between the catalyst layer and the diffusion layer.

As illustrated in FIG. 3, the electrical power of the fuel cells obtained from Examples 1 through 4 was much higher than that obtained from the Comparative Example. As illustrated in FIG. 4, the performance of the fuel cell obtained from Examples 1 through 4 was significantly better than that of the fuel cell obtained from the Comparative Example. Without being bound to any particular theory, this is believed to be due to the reduced electric resistance when the current is transferred to the current collector, the smooth supply of fuel through the diffusion layer using porous material such as mesoporous silica, and the smooth supply and discharge of water. In particular, the hydrophobicity of OMS and $SiO_2$ used in Examples 1, 2 and 4 contributes to the uniform supply of fuel and the smooth discharge of water.

In the Comparative Example, the diffusion layers were required to be sintered at 360° C. for 40 minutes; The diffusion layers of Examples 1 through 4, on the other hand, could be prepared by drying at room temperature and for only 10 minutes. Thus, the fuel cells according to aspects of the present invention provide savings in manufacturing energy and time.

The membrane electrode assembly for a fuel cell according to aspects of the present invention may include electrically nonconductive diffusion layers and supporting layers by installing current collectors close to electrode catalyst layers. Thus, various materials that are hydrophilic, hydrophobic, porous, hydrous, or the like can be used for the diffusion layers and the supporting layers, thereby improving the performance of the fuel cell.

In addition, the manufacturing costs of the membrane electrode assembly for the fuel cell according to aspects of the present invention can be decreased since the membrane electrode assembly can be manufactured quickly with low usage of energy.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A membrane electrode assembly for a fuel cell comprising:
   an electrolyte membrane;
   an anode catalyst layer and a cathode catalyst layer, each being formed on a respective side of the electrolyte membrane;
   an anode current collector formed on the anode catalyst layer and a cathode current collector formed on the cathode catalyst layer, wherein the anode current collector and the cathode current collector each independently comprise at least one transition metal selected from the group consisting of Au, Ag, Al, Ni, Cu, Pt, Ti, Mn, Zn, Fe, Sn, alloys thereof and an electrically conductive polymer; and
   an anode diffusion layer formed on the anode current collector and a cathode diffusion layer formed on the cathode current collector,
   wherein the anode diffusion layer and the cathode diffusion layer are electrically nonconductive.

2. The membrane electrode assembly of claim 1, wherein the anode diffusion layer and the cathode diffusion layer are each composed of a material selected from the group consisting of a hydrophobic material, a hydrophilic material, a hydrous material, a porous material, and a mixture thereof.

3. The membrane electrode assembly of claim 2, wherein the anode diffusion layer and/or the cathode diffusion layer include a hydrophobic material, and the hydrophobic material is a material selected from the group consisting of a polyethylene-based polymer resin, a polystyrene-based polymer resin, a fluorine-based polymer resin, a polypropylene-based polymer resin, a polymethylmethacrylate-based polymer resin, a polyimide-based polymer resin, a polyamide-based polymer resin, a polyethyleneterephthalate-based polymer resin, and a mixture thereof.

4. The membrane electrode assembly of claim 2, wherein the anode diffusion layer and/or the cathode diffusion layer include a hydrophilic material selected from the group consisting of a polymer resin comprising a hydroxyl group, a carboxyl group, an amine group or a sulfone group at at least one end thereof, a polyvinylalcohol-based polymer resin, a cellulose-based polymer resin, a polyvinylamine-based polymer resin, a polyethyleneoxide-based polymer resin, a polyethyleneglycol-based polymer resin, a nylon-based polymer resin, a polyacrylate-based polymer resin, a polyester-based polymer resin, a polyvinylpyrrolidone-based polymer resin, a ethylenevinylacetate-based resin, and a mixture thereof.

5. The membrane electrode assembly of claim 2, wherein the anode diffusion layer and/or the cathode diffusion layer include a hydrous material selected from the group consisting of a polymer resin comprising a hydroxyl group, a carboxyl group, an amine group or a sulfone group at at least one end thereof, a polyvinylalcohol-based polymer resin, a cellulose-based polymer resin, a polyvinylamine-based polymer resin, a polyethyleneoxide-based polymer resin, a polyethyleneglycol-based polymer resin, a nylon-based polymer resin, a polyacrylate-based polymer resin, a polyester-based polymer resin, a polyvinylpyrrolidone-based polymer resin, a ethylenevinylacetate-based resin, $Al_2O_3$, $ZrO_2$, $TiO_2$, $SiO_2$ and a mixture thereof.

6. The membrane electrode assembly of claim 2, wherein the anode diffusion layer and/or the cathode diffusion layer include a porous material having an average diameter of pores in the range of 3 nm to 500 μm.

7. The membrane electrode assembly of claim 2, wherein anode diffusion layer and/or the cathode diffusion layer include a porous material having a void fraction in the range of 10 to 90%.

8. The membrane electrode assembly of claim 1, wherein the anode diffusion layer and/or the cathode diffusion layer comprise a mixture of a particulate nonconductive material and a binder, wherein an amount of the binder is in the range of 20 to 90% by weight based on the weight of the mixture of the particulate nonconductive material and the binder.

9. The membrane electrode assembly of claim 1, further comprising a supporting layer formed on each of the anode diffusion layer and the cathode diffusion layer.

10. The membrane electrode assembly of claim 9, wherein the supporting layer comprises a material selected from the group consisting of a nonconductive material, a conductive material and a mixture thereof.

11. The membrane electrode assembly of claim 9, wherein the supporting layer comprises a carbon-based material selected from the group consisting of carbon fiber, carbon paper, carbon cloth, carbon nanotube, carbon nanofiber, carbon nanohorn, carbon nanoring, carbon black, graphite, fullerene, activated carbon, and acetylene black.

12. The membrane electrode assembly of claim 9, wherein the supporting layer comprises a ceramic material selected from the group consisting of a metal oxide, a silica based compound, a clay, silicon carbide and cordierite.

13. The membrane electrode assembly of claim 1, wherein the anode current collector and the cathode current collector are each in the form of a flexible printed circuit board (FPCB) in which the transition metal is formed on the electrically conductive polymer film.

14. A fuel cell comprising the membrane electrode assembly of claim 1.

* * * * *